US006990233B2

(12) United States Patent
Park et al.

(10) Patent No.: US 6,990,233 B2
(45) Date of Patent: Jan. 24, 2006

(54) APPARATUS AND METHOD FOR EXTRACTING OBJECT BASED ON FEATURE MATCHING BETWEEN SEGMENTED REGIONS IN IMAGES

(75) Inventors: Du-sik Park, Kyungki-do (KR); Chang-yeong Kim, Kyungki-do (KR); Ji-yeon Kim, Seoul (KR); Sang-Kyun Kim, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 693 days.

(21) Appl. No.: 10/050,547

(22) Filed: Jan. 18, 2002

(65) Prior Publication Data

US 2002/0136449 A1     Sep. 26, 2002

(30) Foreign Application Priority Data

Jan. 20, 2001  (KR)  ................................. 2001-3422
Nov. 3, 2001   (KR)  ............................... 2001-68383

(51) Int. Cl.
G06K 9/00       (2006.01)
G06K 9/34       (2006.01)

(52) U.S. Cl. ...................... 382/164; 382/171; 382/190; 382/209; 382/305

(58) Field of Classification Search ................ 382/164, 382/171, 173, 190, 209, 219, 305
See application file for complete search history.

(56) References Cited

U.S. PATENT DOCUMENTS

| | | | |
|---|---|---|---|
| 5,109,435 A | | 4/1992 | Lo et al. |
| 5,138,621 A | | 8/1992 | Goto et al. |
| 5,500,904 A | | 3/1996 | Markandey et al. |
| 5,748,775 A | * | 5/1998 | Tsuchikawa et al. ........ 382/190 |
| 5,836,872 A | | 11/1998 | Kenet et al. |

(Continued)

FOREIGN PATENT DOCUMENTS

JP    2000-082145    3/2000

(Continued)

OTHER PUBLICATIONS

English translation of Notice to Submit Response in corresponding Korean Patent Application No. 10-2001-0068383, dated Feb. 13, 2004 and citing the above document.

(Continued)

*Primary Examiner*—Phuoc Tran
(74) *Attorney, Agent, or Firm*—Buchanan Ingersoll PC (57) ABSTRACT

An apparatus and method for extracting object based on feature matching between segmented regions in images are provided. The apparatus includes an image input unit for receiving a query image including an object and an object extraction target image from which the object included in the query image is to be extracted; an object position determination unit for determining a position of the object in the object extraction target image using pixel based color feature matching; an image segmentation unit for segmenting each of the query image and the object extraction target image into a plurality of regions using image features including color or texture; and an object region determination unit for performing matching between the segmented regions in the query image and the segmented regions in the determined position of the object in the object extraction target image using color or texture features and determining a final object region using similarity in spatial adjacency between matching regions obtained as a result of the matching. Accordingly, an image region of a particular object can be automatically extracted from an object extraction target image. Therefore, the apparatus can be applied to video editors, video authoring tool, object based video encoder, interactive video authoring tool, and the like.

32 Claims, 8 Drawing Sheets

U.S. PATENT DOCUMENTS 5,862,508 A    1/1999   Nagaya et al.
5,943,442 A    8/1999   Tanaka et al.
6,335,985 B1 * 1/2002   Sambonsugi et al. ....... 382/190

FOREIGN PATENT DOCUMENTS

JP    A-2000-82145    3/2000

OTHER PUBLICATIONS

Joo, J., et al., *Robust object tracking using projection motion and histogram intersection*, Proceedings of the lasted International Conference Signal Processing, Pattern Recognition, and Applications, Jul. 2001, pp. 1-4, Greece.

Camapum, J., et al., *Segmentation using Spatial-Feature Clustering from Image Sequences*, IEEE Comput. Soc., Oct. 1998, pp. 799-803, Los Alamitos, CA.

Tsai, C., et al., *Efficient Image Retrieval Approaches for Different Similarity Requirements*, Proceedings of the SPIE—The International Society for Optical Engineering, vol. 3972, Jan. 2000, pp. 471-482, San Jose, CA.

Celenk, M., *Colour image segmentation by clustering*, IEE Proceedings-E, vol. 138, No. 5, Sep. 1991, p. 368-376, Great Britain.

* cited by examiner

ORIGINAL IMAGE

FIG. 5B

SEGMENTED IMAGE

FIG. 6

|   | 1 | 2 | 3 | 4 |
|---|---|---|---|---|
| 1 | 0 | 1 | 1 | 1 |
| 2 | 1 | 0 | 1 | 0 |
| 3 | 1 | 1 | 0 | 1 |
| 4 | 1 | 0 | 1 | 0 |

FIG. 7A

|   | 1 | 2 | 3 | 4 |
|---|---|---|---|---|
| 1 | 0 | 1 | 1 | 1 |
| 2 | 1 | 0 | 1 | 0 |
| 3 | 1 | 1 | 0 | 1 |
| 4 | 1 | 0 | 1 | 0 |

ADJACENCY MATRIX OF QUERY IMAGE

FIG. 7B

|   | 1 | 2 | 3 | X |
|---|---|---|---|---|
| 1 | 0 | 1 | 0 | 0 |
| 2 | 1 | 0 | 1 | 0 |
| 3 | 0 | 1 | 0 | 0 |
| X | 0 | 0 | 0 | 0 |

ADJACENCY MATRIX OF OBJECT
EXTRACTION TARGET IMAGE

FIG. 7C

|   | 1 | 2 | 3 | X |
|---|---|---|---|---|
| 1 | 1 | 1 | 0 | 0 |
| 2 | 1 | 1 | 1 | 0 |
| 3 | 0 | 1 | 1 | 0 |
| 4 | 0 | 0 | 0 | 1 |

COMPARISON MATRIX

FIG. 8A

|   | 1 | 2 | 3 |
|---|---|---|---|
| 1 | 0 | 1 | 1 |
| 2 | 1 | 0 | 1 |
| 3 | 1 | 1 | 0 |

ADJACENCY MATRIX OF QUERY IMAGE

FIG. 8B

|   | 1 | 2 | 3 | 4 |
|---|---|---|---|---|
| 1 | 0 | 1 | 0 | 1 |
| 2 | 1 | 0 | 1 | 0 |
| 3 | 0 | 1 | 0 | 1 |
| 4 | 1 | 0 | 1 | 0 |

ADJACENCY MATRIX OF OBJECT EXTRACTION TARGET IMAGE

FIG. 8C

|   | 1 | 2 | 3 |
|---|---|---|---|
| 1 | 0 | 1 | 0 |
| 2 | 1 | 0 | 1 |
| 3 | 0 | 1 | 0 |

COMPARISON MATRIX

FIG. 9A

|   | 1 | 2 | 3 | 4 |
|---|---|---|---|---|
| 1 | 30 | 18 | 20 | 45 |
| 2 | 15 | 25 | 50 | 8 |
| 3 | 10 | 20 | 45 | 22 |

DISTANCE MATRIX

FIG. 9B

|   | 2 | 4 | 1 |
|---|---|---|---|
| 1 | 0 | 1 | 0 |
| 2 | 1 | 0 | 1 |
| 3 | 0 | 1 | 0 |

COMPARISON MATRIX

APPARATUS AND METHOD FOR EXTRACTING OBJECT BASED ON FEATURE MATCHING BETWEEN SEGMENTED REGIONS IN IMAGES

Priority is claimed to patent application Nos. 2001-3422 filed in Rep. of Korea on Jan. 20, 2001 and 2001-68383, filed in the Republic of Korea on Nov. 3, 2001.

BACKGROUND OF THE INVENTION

1. Field of the Invention

The present invention relates to an apparatus and method for extracting region information of objects queried in object extraction target images (still images or video sequences), from which the object is to be extracted, in which an image of the object to be extracted is given as a query image, the object extraction target image is processed in unit of pixels to determine the position of the object therein, and the query image is compared with an image composed of segmented regions of the object extraction target image at a position determined as the position of the object in terms of color feature, texture feature, and similarity in spatial disposition.

2. Description of the Related Art

Approaches of extracting an object from an image are largely divided into three categories, i.e., motion based extraction using the movement of an object, feature based extraction using the feature of an object region, and a manual operation using video edition software.

Approaches of motion based extraction are divided into extraction of a motion area based on calculation of frame differences, extraction based on background subtraction, and extraction based on motion analysis. In approaches using frame differences disclosed in U.S. Pat. Nos. 5,500,904 and 5,109,435, differences in brightness among consecutive image frames are calculated to extract motion, which is a basic method of extracting a motion area. In an approach based on background subtraction which is disclosed in U.S. Pat. No. 5,748,775, a background image is reconstructed using temporal changes of image feature parameter values, and an object is extracted using a difference between the reconstructed background image and an original image. In an approach based on motion analysis which is disclosed in U.S. Pat. No. 5,862,508, the moving direction and velocity of a moving object are calculated to extract a motion area. This approach is a most general motion area extraction method which can be applied even when illumination conditions or the structure of a background changes. The above-described motion based extraction can be applied when there is the appropriate quantity of motion of an object in consecutive images. However, it is difficult to apply the motion base extraction to still images, images having a slight motion, or images having exceeding motion velocity.

Approaches of feature based extraction can be divided into template matching, multi-value threshold based segmentation, and feature matching. In a template matching method disclosed in U.S. Pat. No. 5,943,442, an object to be extracted is defined as a template image, and a region for which a normalized correlation value is maximum is extracted as an object region in an image to be searched. However, when the size of the object changes or the object rotates, the normalized correlation value sensitively reacts, so extraction performance decreases. In a method of extracting an object using multi-value thresholds which is disclosed in U.S. Pat. No. 5,138,671, the distribution of the lightness values or color values of an image is segmented into a plurality of regions using multi-value thresholds, and each region is considered as an object region. In this method, it is not easy to accurately distinguish an object from a background.

In a manual method using video editing software, an object is manually extracted. According to this method, accuracy of object extraction is high, but an amount of time is required. Accordingly, this method is not proper to editing of database images including successive images or a large amount of images.

SUMMARY OF THE INVENTION

To solve the above-described problems, it is a first objective of the present invention to provide a method and apparatus for extracting an object using feature matching between segmented regions in different images.

It is a second objective of the present invention to provide a computer readable recording medium on which a program for executing the above method in a computer is recorded.

To achieve the first objective of the invention, there is provided an apparatus for extracting an object from an image. The apparatus includes an image input unit for receiving a query image including an object and an object extraction target image from which the object included in the query image is to be extracted; an object position determination unit for determining a position of the object in the object extraction target image using pixel based color feature matching; an image segmentation unit for segmenting each of the query image and the object extraction target image into a plurality of regions using image features including color or texture; and an object region determination unit for performing matching between the segmented regions in the query image and the segmented regions in the determined position of the object in the object extraction target image using color or texture features and determining a final object region using similarity in spatial adjacency between matching regions obtained as a result of the matching.

There is also provided a method of extracting an object from an image. The apparatus includes the steps of (a) receiving a query image including an object and an object extraction target image from which the object included in the query image is to be extracted; (b) determining a position of the object in the object extraction target image using pixel based color feature matching; (c) segmenting the query image and the object extraction target image into a plurality of regions using image features including color or texture; and (d) performing matching between the segmented regions in the query image and the segmented regions in the determined position of the object in the object extraction target image using color or texture features and determining a final object region using similarity in spatial adjacency between matching regions obtained as a result of the matching.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to the attached drawings.

Figure 1:
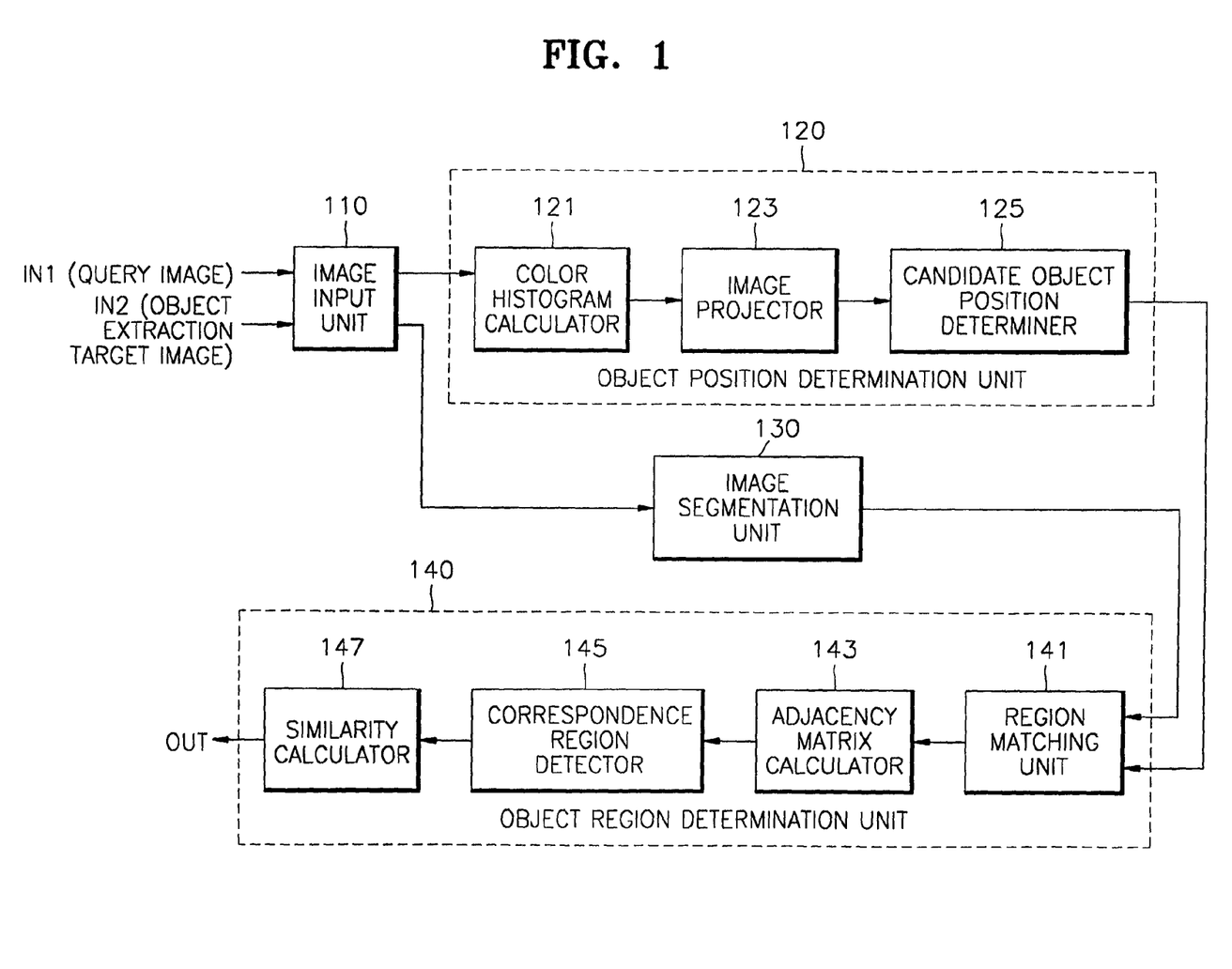
FIG. 1 is a block diagram of a preferred embodiment of an object extraction apparatus according to the present invention.

FIG. 1 is a block diagram of a preferred embodiment of an object extraction apparatus according to the present invention. The object extraction apparatus includes an image input unit 110, an object position determination unit 120, an image segmentation unit 130, and an object region determination unit 140. Preferably, the object position determination unit 120 includes a color histogram calculator 121, an image projector 123, and a candidate object position determiner 125. The object region determination unit 140 includes a region matching unit 141, an adjacency matrix calculator 143, a correspondence region detector 145, and a similarity calculator 147.

Figure 2:
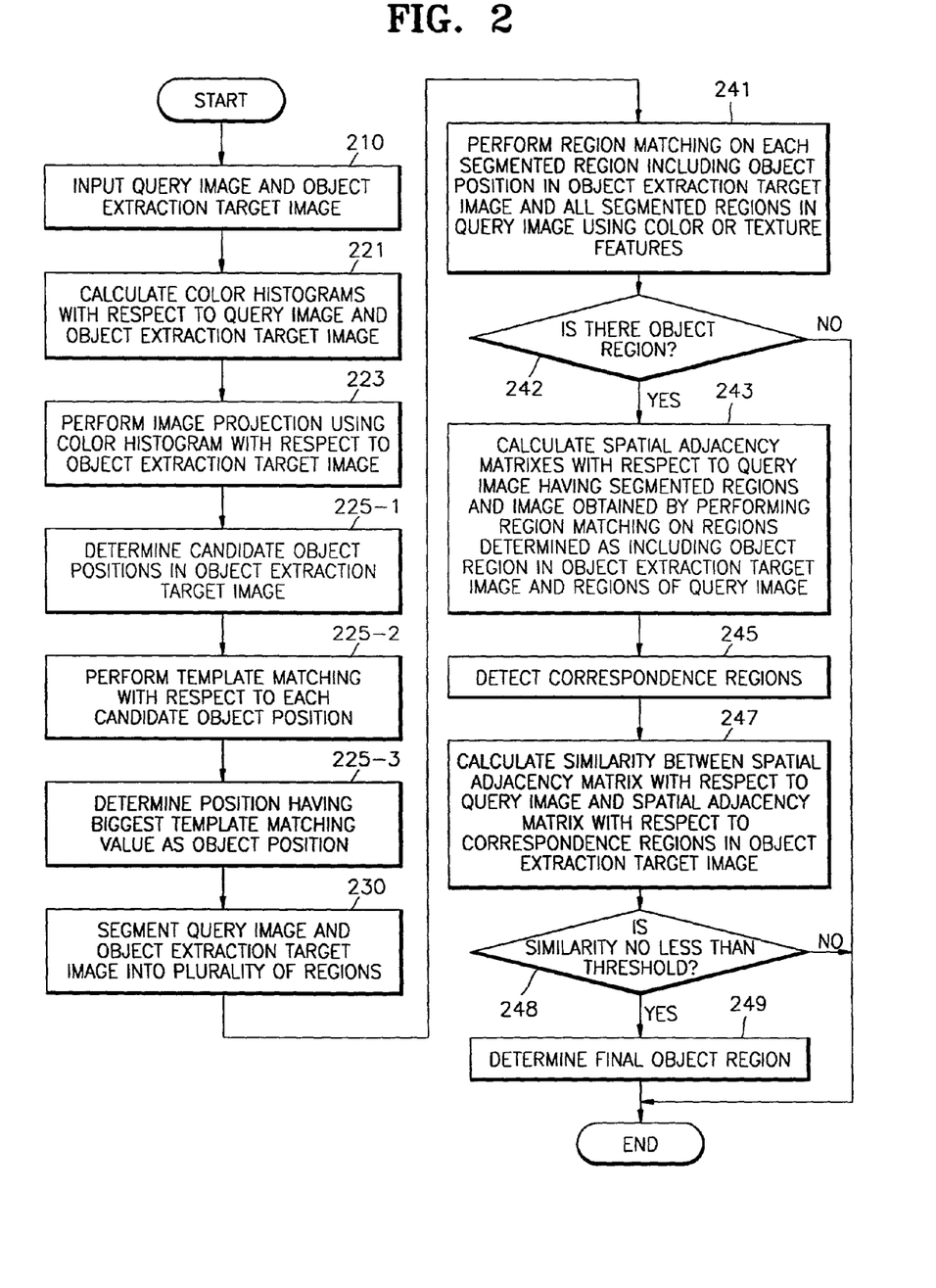
FIG. 2 is a flowchart of a method of extracting an object according to the present invention.

FIG. 2 is a flowchart of a preferred embodiment of a method of extracting an object according to the present invention. The operation of the object extraction apparatus shown in FIG. 1 is described in detail with reference to FIG. 2.

The image input unit 110 receives a query image including an object and an object extraction target image in step 210. Here, the query image is an image including an object to be extracted. The query image is obtained by photographing an object to be extracted against a blue screen or obtained by separating an object from a background in an arbitrary image frame including the object in a moving picture using a video editor. Here, the values of all pixels in a background region other than an object region are processed as 0 (black). The object extraction target image is an arbitrary image or a key frame image selected from the moving picture using a shot detection technique. In the case where the object extraction target image is a key frame image of the moving picture, the key frame image may or may not include the object to be extracted. The query image and the object extraction target image should be prepared before starting the steps of the present invention.

Next, the object position determination unit 120 performs color feature matching between the query image and the object extraction target image in unit of pixels to determine the position of the object in the object extraction target image in steps 221 through 225-3.

Figure 3:
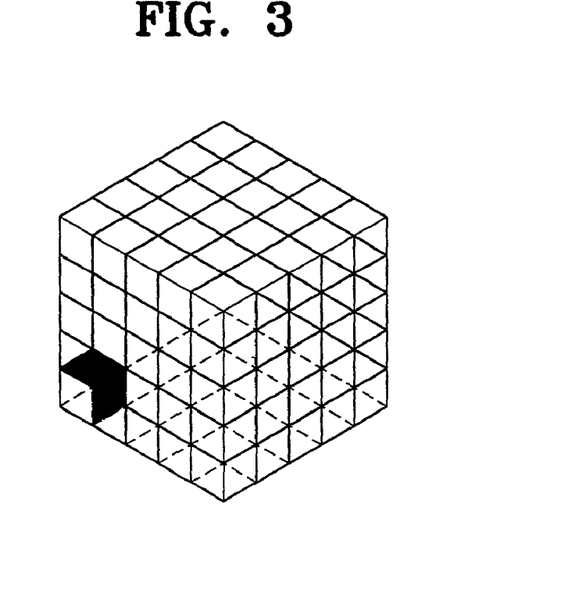
FIG. 3 is a diagram for explaining a quantized color space and a bin which are used in the present invention.

Specifically, the color histogram calculator 121 calculates color histogram values with respect to the query image and the object extraction target image using a selected color space and a quantization level in step 221. Here, the color histogram value indicates the number of pixels included in each bin in a quantized color space. FIG. 3 shows the example of a quantized color space with bins, which is used in the present invention. In this example, a color space is presented as a three-dimensional space having red (R), green (G) and blue (B) axes. In FIG. 3, each of the three axes is divided into five sections starting from 0 such that the five sections end at values 51, 102, 153, 204, and 255 to quantize the color space into a cube having a predetermined volume. Here, a bin indicates a one section, for example, a blackened portion in FIG. 3, in the quantized three-dimensional color space.

When the number $C_{mi}$ of pixels included in each bin is less than a threshold, pixels in the corresponding bin are considered as noise, and a color histogram value is set as zero. The threshold can be defined as thrPixel=SUM($C_{mi}$)/n. Here, "i" is a bin number having a value 0 through n−1, "n" is the number of bins, and $C_{mi}$ is the number of pixels included in an i-th bin in a query image. In this case, pixels having a color value whose frequency of appearance is low in an image are considered as noise. The value of a color histogram with respect to a region which is identified as a background (having a pixel value 0) is processed as zero, thereby determining a final color histogram value. In the embodiment of the present invention, an RGB color space and 8×8×8 quantization are used. However, the present invention is not restricted to a particular color space or quantization. Other color space such as YCbCr or L*u*v can be used. For quantization, other level such as 4×4×4 or 16×16×16 can be used. When a color space or a quantization level changes, the result may slightly change.

The image projector 123 calculates ratio histogram values and replaces the value of each pixel in the object extraction target image with a ratio histogram value in step 223. This is image projection using a color histogram. A ratio histogram value can be calculated using the following two methods. In a first method, the number of pixels included in the i-th bin of the query image is divided by the number of all valid pixels in the query image. That is, a ratio histogram value is defined as $R[Ci]=[C_{mi}/SUM(C_{mi})_{-effective}]$. Here, $SUM(C_{mi})_{-effective}$ indicates the number of effective pixels within an i-th bin. In a second method, between 1 and a value obtained by dividing the number of pixels in a bin in the query image by the number of pixels in a bin corresponding to the bin of the query image in the object extraction target image, a less value is selected as a ratio histogram value. That is, a ratio histogram value is defined as $R[Ci]=\min[(C_{mi}/C_{di}), 1]$. Here, R[Ci] indicates a ratio of pixels having a color corresponding to the i-th bin. A pixel value is replaced with a ratio histogram value corresponding to the color value of each pixel in the object extraction target image, thereby performing image projection.

Next, the candidate object position determiner 125 determines candidate object positions in the object extraction target image with ratio histogram values as 106 pixel values in step 225-1. Specifically, a minimum rectangular bounding box surrounding the region of the object in the query image is obtained. A mask having a particular size determined based on the size of the bounding box is convolved with respect to the object extraction target image having the ratio histogram values to calculate a measure of a likelihood of existence of the object with respect to each pixel. If the calculated measure exceeds a reference value, the position of a corresponding pixel is determined as a candidate object position.

Here, a mask W used for calculating a measure at each pixel $(x_p, y_p)$ may be a circle which is defined by Formula (1) and whose radius is WR.

$$W = \begin{cases} 255, & \sqrt{(x-x_p)^2 + (y-y_p)^2} \leq WR \\ 0, & \text{otherwise} \end{cases} \quad (1)$$

$$WR = \alpha\left(bs + (bl - bs)b\frac{S}{bl}\right)$$

Here, WR is a value defined by the bounding box, bl is the length of the longer side of the bounding box, bs is the length of the shorter side of the bounding box, and α is a variable for adjusting the size of the mask W. A measure of likelihood of existence of the object at each pixel is represented by "loc", which is defined as loc(x,y)=W*p(x,y). Here, p(x,y) is a ratio histogram value at a pixel (x,y), and "*" indicates convolution. The loc(x,y) is normalized such that a maximum value is 255. If a loc value is at least a reference value, the position of the pixel (x,y) is determined as a candidate object position. In Formula (1), multiple positions of the object can be determined by adjusting the variable α. In other words, when the size of an object to be extracted is different between the query image and the object extraction target image, the change in the size can be considered.

If the candidate object positions are determined in step 225-1, color distance differences between a pixel within a rectangular region of a particular size including a part of the object region in the query image or the entire object region and a pixel within a rectangular region of the particular size around a candidate object position in the object extraction target image to perform template matching in step 225-2. At least one object position is determined based on an average color distance difference in step 225-3. Specifically, when the average of color distance differences between a pixel within a mask surrounding the object region in the query image and a pixel within a mask within a pixel at a position determined as a candidate object position by the candidate object position determiner 125 in the object extraction target image is minimum, the candidate object position is determined as an object position, and another average is the second least value, a corresponding candidate object position is determined as another object position. With such arrangement, at least one object position is determined. Here, the mask is a rectangular region having a particular size, for example, having bs as length and width, determined based on the size of the bounding box in the query image. The average $AD_{pixelcolor}$ of color distance differences between a pixel in the query image and a pixel in the object extraction target image can be defined by Formula (2).

$$AD_{pixelcolor} = \frac{1}{N}\sum_{i=1}^{N}\sqrt{(R_q - R_d)^2 + (G_q - G_d)^2 + (B_q - B_d)^2} \quad (2)$$

Here, N indicates the number of valid pixels for which Rq=Gq=Bq=0 is not true, and pixels for which Rq=Gq=Bq=0 is true are excluded in the above calculation. In Formula (2), q indicates the query image, and d indicates the object extraction target image.

Figure 5A:
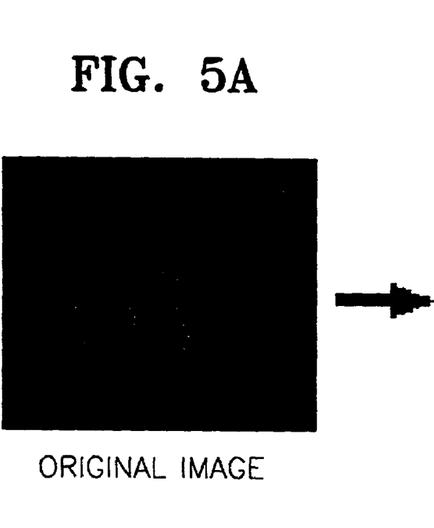
FIGS. 5A and 5B show the examples of an original image and a segmented image assigned label numbers.
Figure 5B:
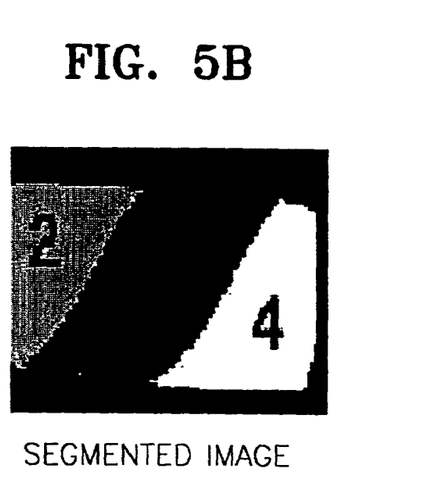

The image segmentation unit 130 segments each of the query image and the object extraction target image, which are received through the image input unit 110, into a plurality of regions using image features including color or texture in step 230. A method of dividing an image is not restricted to a particular one, but typical image dividing methods can be used. A preferred embodiment of image division is illustrated in FIGS. 5A and 5B. FIG. 5A shows an original image, and FIG. 5B shows a segmented image. Referring to FIG. 5B, each segmented region is assigned a label number.

The object region determination unit 140 performs region matching on each segmented region in a position determined as an object position by the object position determination unit 120 in the object extraction target image and all of the segmented regions in the query image using color or texture features, and determines a final object region using a similarity in spatial adjacency between matching regions in steps 241 through 249.

Specifically, the region matching unit 141 detects segmented regions which meet the mask W centering on a position determined as an object position in the object extraction target image and calculates similarities between each of the detected region in the object extraction target image and all of the segmented regions in the query image to perform region matching in step 241. If the similarity is less than a predetermined threshold, the corresponding detected region in the object extraction target image is determined as an object region. If the similarity distance exceeds the predetermined threshold, a corresponding detected region is excluded from the object region. Here, the similarity distance is determined by a distance $D_{CT}$ in a color-texture space, and the distance $D_{CT}$ can be expressed by Formula (3).

$$D_{CT}(x, y) = \frac{w_c D_c(x, y) + w_t D_t(x, y)}{w_c + w_t} \quad (3)$$

Here, $D_c(x,y)$ and $D_t(x,y)$ indicate a distance between two regions x and y in a color space and a distance between the two regions x and y in a texture space, respectively, and $w_c$ and $w_t$ indicate weight coefficients, respectively, applied to the respective distances. Hereinafter, an example of calculating $D_c(x,y)$ and $D_t(x,y)$ will be described in detail. The color feature of each segmented region is represented by brightness B, hue H, and saturation S which are defined by Formula (4).

$$H = \begin{cases} 120° & (b-u)/(g+b-2u) + 60°, & \text{if } r = u \\ 120° & (r-u)/(b+r-2u) + 180°, & \text{if } g = u \\ 120° & (g-u)/(r+g-2u) + 300°, & \text{if } b = u \end{cases} \quad (4)$$

$$S = 1 - u/(r + g + b)$$

$$B = \sqrt{(r^2 + g^2 + b^2)/3}$$

Here, r, g, and b indicate the average color values of an input region, and u=min(r,g,b). A distance in a BHS color space can be used as the distance $D_c(x,y)$ in the color space, as shown in Formula (5).

$$D_c(x,y)=K_B|B(x)-B(y)|+K_H|H(x)-H(y)|+K_S|S(x)-S(y)| \quad (5)$$

Here, B(x), H(x), and S(x) indicate brightness, hue, and saturation, respectively, of a point in the color space, and $K_B$, $K_H$, and $K_S$ indicate weight coefficients, respectively, applied to distance differences with respect to brightness, hue, and saturation.

The texture feature space is formed using a multi-size and multi-direction texture features. Each feature is obtained by summing a multi-direction local variation v and a multi-direction local oscillation g with respect to each pixel. The brightness B of an image is used for detecting such texture features.

In obtaining a texture feature, pixels in a length of 2L are rotated around a pixel (m, n) at an angle of $\alpha_k k\pi/K(k=0, \ldots, K-1)$. Here, L is described with reference to FIG. 4.

Figure 4:
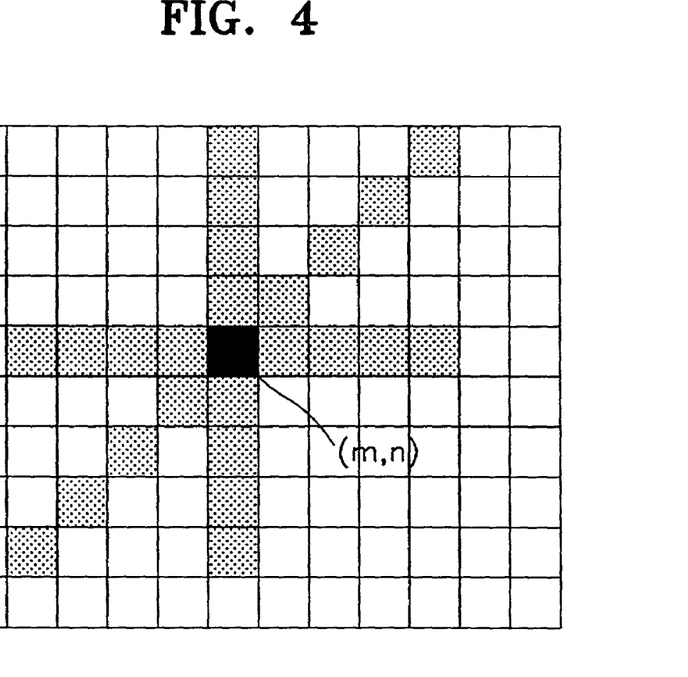
FIG. 4 is a diagram for explaining rotation around a pixel (m, n)

FIG. 4 is a diagram for explaining rotation around a pixel (m, n) and the meaning of L. A black portion in FIG. 4 is a pixel (m, n) for which a texture feature is to be calculated. Four pixels above, below, on the left of, and on the right of the pixel (m, n) are marked with shadow. Here, L is 4. Pixels on a diagonal line shows a state in which four pixels has rotated around the pixel (m, n) at an angle of 45°.

"$y_i(-L \leq i \leq L)$" indicates the brightness B of one among such pixels uniformly distributed in an array. Here, $d_i = y_{i+1} - Y_i$ indicates the gradient in the brightness among adjacent pixels in the array, and $w_i = u \cos(i\pi/(2L+1))$ is a cosine weight function. The coefficient u is used for forming $\Sigma w_i = 1$. Upward and downward weight variations formed by the above factors can be expressed by Formula (6).

$$V^+ = \sum_{i=-L}^{L-1} w_i d_i, \text{ if } d_i > 0, \quad V^- = \sum_{i=-L}^{L-1} w_i(-d_i), \text{ if } d_i < 0 \qquad (6)$$

Here, a less value between the two values in Formula (6) is selected as the local variation v. In other words, the local variation v is defined as Formula (7).

$$v = \min(V^+, V^-) \qquad (7)$$

The local oscillation g is the number of $d_i$, whose magnitude of oscillation exceeds a predetermined threshold of sensitivity when its sign changes, among $d_i$ obtained in a range of the length of the array, $-L \leq i \leq L$. A texture feature, $\tilde{t}_k = v_k g_k$, of each pixel can be obtained by multiplying the local variation of the pixel by the local oscillation of the pixel. To uniform the obtained texture features, each of the texture features is smoothed to a mean value for an h-sized window and processed by hyperbolic tangent transform using a transforming formula as shown in Formula (8), thereby decreasing high texture features and increasing low texture features.

$$t_i = \tanh\left(\alpha \sum_h \tilde{t}_k(h)\right) \qquad (8)$$

Texture is a feature depending on the size of an image. Accordingly, the size of an image is decreased by ½ S times using different frequencies, and a texture feature of each pixel is obtained in the same manner as described above whenever the size of the image is decreased. Such a texture feature can be expressed by Formula (9).

$$t_k^s = \tanh\left(\alpha \sum_h \tilde{t}_k^s(h)\right) \qquad (9)$$

According to Formula (9), the number of texture features of each pixel is KS. The KS texture features of each pixel in each region are used for obtaining the texture distance between pixels in different regions. The texture distance is defined by Formula (10).

$$D_t(x, y) = \sum_{s=1}^{S} w^s \sum_{k=1}^{K} |t_k^s(x) - t_k^s(y)| \qquad (10)$$

Here, x and y indicate two points in a texture space, $t_k^s(x)$ and $t_k^s(y)$ indicate texture features, respectively of x and y, and $w^s$ indicates a weight coefficient applied to the multi-size of the texture.

The region matching unit 141 determines whether at least one object region exists in the object extraction target image based on the calculated similarity distance in step 242. If it is determined that there is no object region, it is determined that the object extraction target image does not include the object to be extracted, and the procedure ends. In contrast, if it is determined that there is at least one object region, it is determined that the object extraction target image includes the object to be extracted.

Next, the adjacency matrix calculator 143 receives the query image having the segmented regions and an image obtained by performing region matching with respect to the segmented regions determined as including the object region in the object extraction target image and the segmented regions of the query image, and calculates a spatial adjacency matrix with respect to the segmented regions in each of the input images in step 243. Each of the segmented regions is assigned a label number, and adjacencies among the segmented regions are shown in the form of a matrix. When two segmented regions are adjacent, a corresponding element in the matrix has a value 1. When two segmented regions are not adjacent, a corresponding element in the matrix has a value 0. A preferred embodiment of such an adjacency matrix is shown in FIG. 6.

Figure 6:
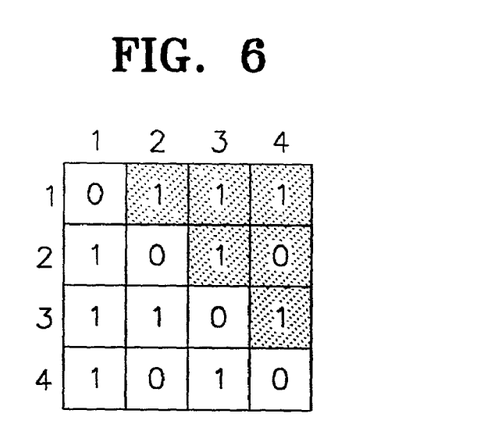
FIG. 6 shows an adjacency matrix with respect to the image shown in FIG. 5B.

FIG. 6 shows an adjacency matrix with respect to the image shown in FIG. 5B. Since the regions 2 and 3 are adjacent, an element at a position (2, 3) in a matrix has a value 1. Since the regions 2 and 4 are not adjacent, an element at a position (2, 4) in a matrix has a value 0. As described above, the label numbers of the segmented regions are assigned to both row and column in a matrix, and adjacency between two regions is represented by 1 or 0 at a corresponding element, thereby forming an adjacency matrix.

Next, the correspondence region detector 145 detects regions in the object extraction target image, which correspond to the regions constructing the adjacency matrix of the query image, using the adjacency matrixes in step 245. Specifically, correspondence regions between the query image and the object extraction target image are shown in a comparison matrix. It is necessary to obtain a comparison matrix in different manners according to the number of segmented regions in the query image and the number of segmented regions in the object extraction target image.

(1) When the number of segmented regions in the query image is greater than the number of segmented regions in the object extraction target image, for example, when the number of segmented regions in the query image is 4, and the number of segmented regions in the object extraction target image is 3, the adjacency matrixes of the query image and the object extraction target image are obtained;

a square comparison matrix is constructed based on the number of segmented regions in the query image; and a label number is added in the adjacency matrix of the object extraction target image, but the values of elements corresponding to the additional label number are set to zero.

Figure 7A:
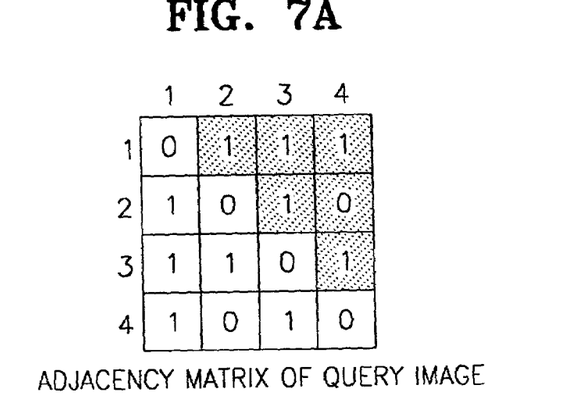
FIGS. 7A through 7C show a preferred embodiment of a method of obtaining a comparison matrix when the number of segmented regions in a query image is greater than the number of segmented regions in an object extraction target image.
Figure 7B:
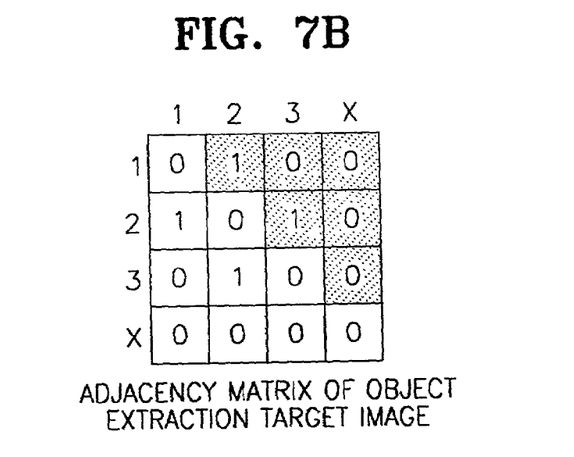
Figure 7C:
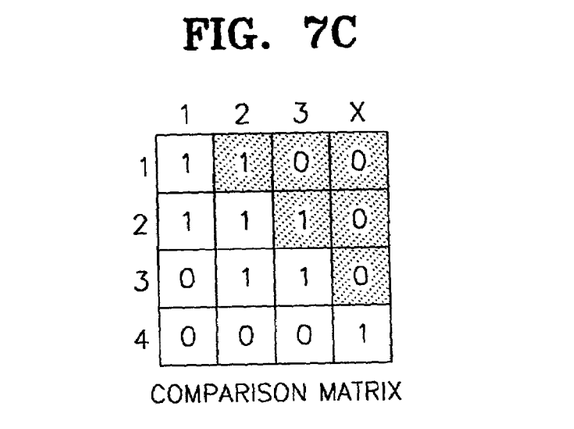

FIGS. 7A through 7C show a preferred embodiment of a method of obtaining a comparison matrix when the number of segmented regions in the query image is greater than the number of segmented regions in the object extraction target image. FIG. 7A shows an example of the adjacency matrix of the query image. FIG. 7B shows an example of the adjacency matrix of the object extraction target image. FIG. 7C shows an example of a comparison matrix obtained from the adjacency matrixes shown in FIGS. 7A and 7B. Here, "x" in FIGS. 7B and 7C is an additional label number.

(2) When the number of segmented regions in the query image is less than the number of segmented regions in the object extraction target image, the adjacency matrixes of the query image and the object extraction target image are obtained;

a square comparison matrix is constructed based on the number of segmented regions in the query image; and some label numbers in the object extraction target image are excluded from the comparison matrix.

Figure 8A:
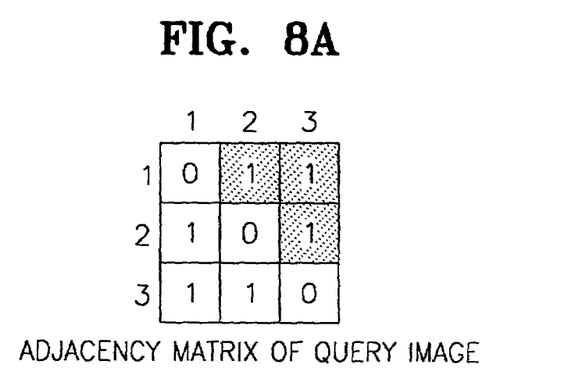
FIGS. 8A through 8C show a preferred embodiment of a method of obtaining a comparison matrix when the number of segmented regions in a query image is less than the number of segmented regions in an object extraction target image.
Figure 8B:
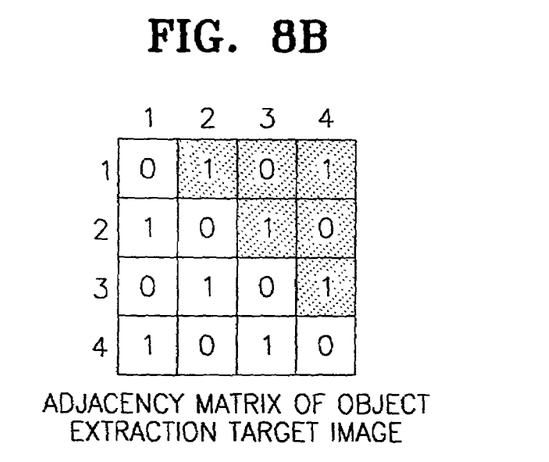
Figure 8C:
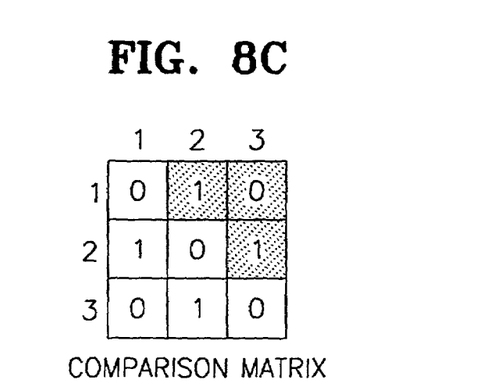

FIGS. 8A through 8C show a preferred embodiment of a method of obtaining a comparison matrix when the number of segmented regions in the query image is less than the number of segmented regions in the object extraction target image. FIG. 8A shows the adjacency matrix of the query image. FIG. 8B shows the adjacency matrix of the object extraction target image. FIG. 8C shows a comparison matrix obtained from the adjacency matrixes shown in FIGS. 8A and 8B.

In FIGS. 7A through 8C, a comparison matrix is constructed by matching the same label numbers between the query image and the object extraction target image. However, the comparison matrix obtained by the above method shown in FIGS. 7A through 8C is valid only when it is assumed that regions having the same label number have the same features (color and texture features). In other words it is necessary to search a correspondence region, which has the most similar attribute to each label numbered region in the query image, in the object extraction target image. Only when a comparison matrix is obtained using the label number of each correspondence region, region comparison between the query image and the object extraction target image is valid. Such a correspondence region is determined as follows.

(1) A matrix having the region label numbers of the query image as a row and the region label numbers of the object extraction target image as a column is obtained, distances between the segmented regions in the query image and distances between the segmented regions in the object extraction target image are obtained, and a distance matrix having the obtained distances as elements is obtained. Here, the distance is a distance $D_{CT}(x,y)$ in a color-texture space.

(2) Regions corresponding to the regions of the query image in the object extraction target image are detected according to the distance matrix, and the comparison matrix is reconstructed based on the detected correspondence regions.

Figure 9A:
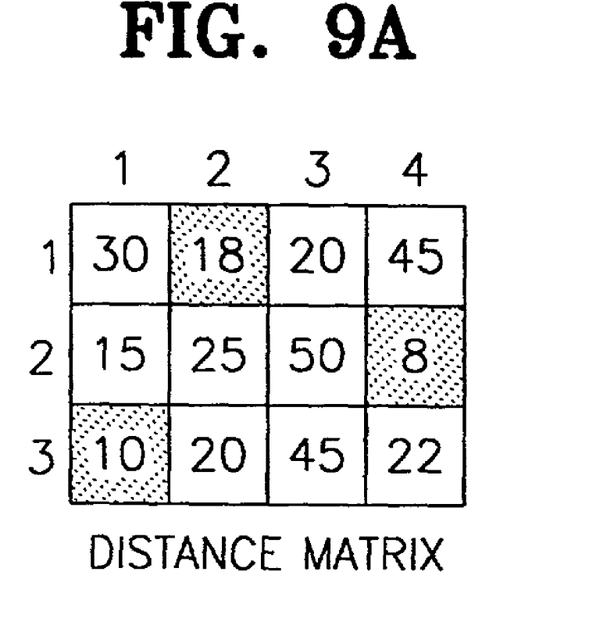
FIGS. 9A and 9B show the examples of a distance matrix and a comparison matrix according to the distance matrix, respectively.
Figure 9B:
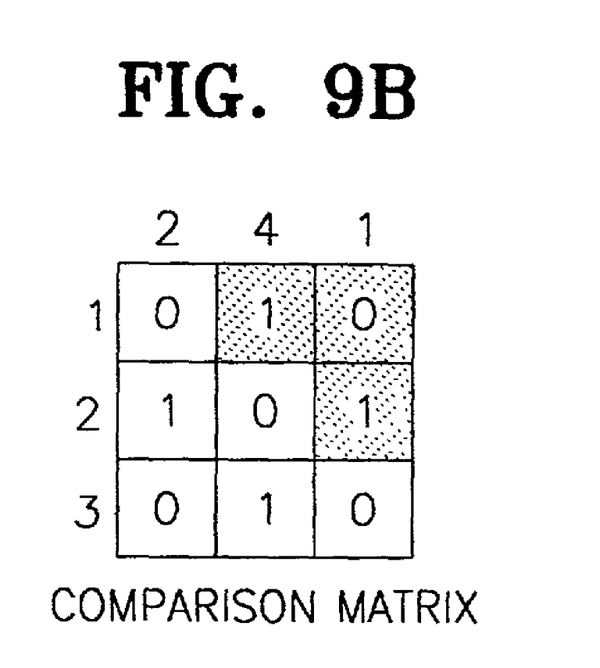

FIGS. 9A and 9B show a preferred embodiment of a procedure for searching regions, which have the most similar attributes to the regions having different label numbers, respectively, in the query image, in the object extraction target image and obtaining a comparison matrix based on the searched correspondence regions. FIG. 9A is a preferred embodiment of a distance matrix indicating distances between regions in the query image and regions in the object extraction target image. FIG. 9B is a preferred embodiment of a comparison matrix which is reconstructed using the label numbers assigned to regions between which distances are shortest in FIG. 9A. Elements marked with shadow in the distance matrix of FIG. 9A indicate the shortest distances between regions in the query image and the regions in the object extraction target image. In FIGS. 9A and 9B, the query image has three regions and the object extraction target image has four regions. It can be seen that label numbers in the comparison matrix change according to correspondence regions obtained based on the distance matrix.

Next, the similarity calculator calculates similarity in spatial adjacency matrix in step 247. The similarity is obtained by dividing the number $E_u$ of 1s in the comparison matrix by the number $M_u$ of all elements in an upper triangular matrix. When the adjacency in the query image and the adjacency in the object extraction target image are completely the same, the value of similarity is 1. In contrast, when the adjacencies are completely different, the value of similarity is 0. In other words, similarity Si in spatial adjacency between the query image and the object extraction target image can be obtained by Formula (11).

$$Si = \frac{E_u}{M_u} \qquad (11)$$

Next, it is determined whether the calculated similarity is no less than a threshold in step 248. If it is determined that the calculated similarity is no less than the threshold, a final object region is determined in step 249. In other words, it is determined whether a region in the object extraction target image, which is obtained by performing region matching using color and texture features, is a region of the object to be extracted. Regions finally determined as a region of the object are determined as the object. The values of pixels in the final object regions are set to the values of pixels in an original image, and the values of pixels in the other regions in the object extraction target image are set to zero. In contrast, if it is determined that the calculated similarity is less than the threshold, it is determined that the object to be extracted does not exist in the object extraction target image, and the values of all pixels in the object extraction target image are set to zero.

Figure 10A:
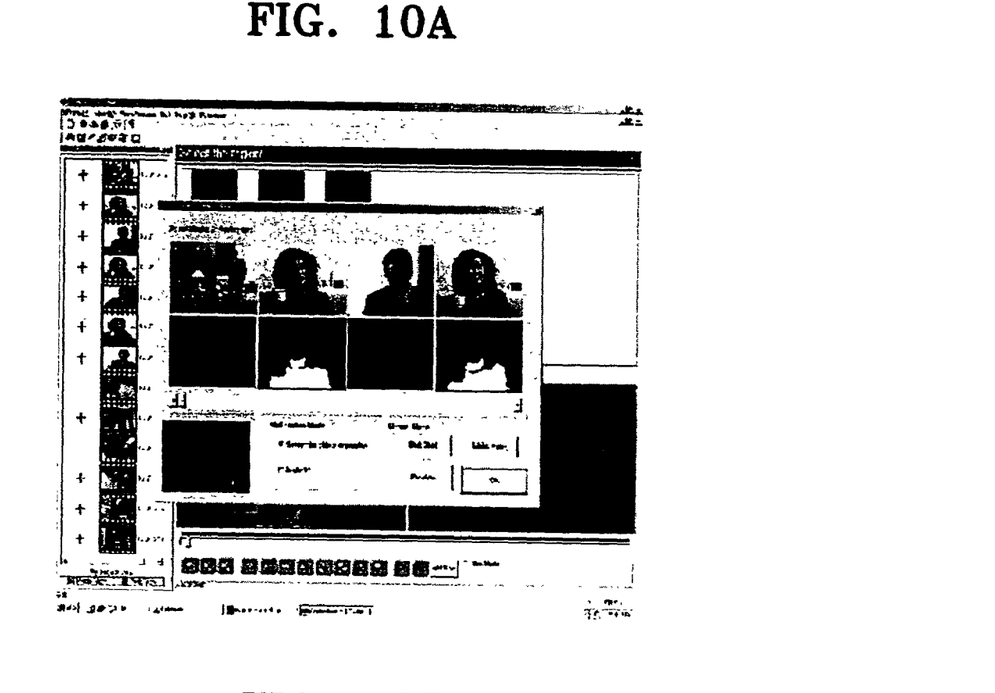
FIGS. 10A and 10B show the results of extracting two different objects from object extraction target images.
Figure 10B:
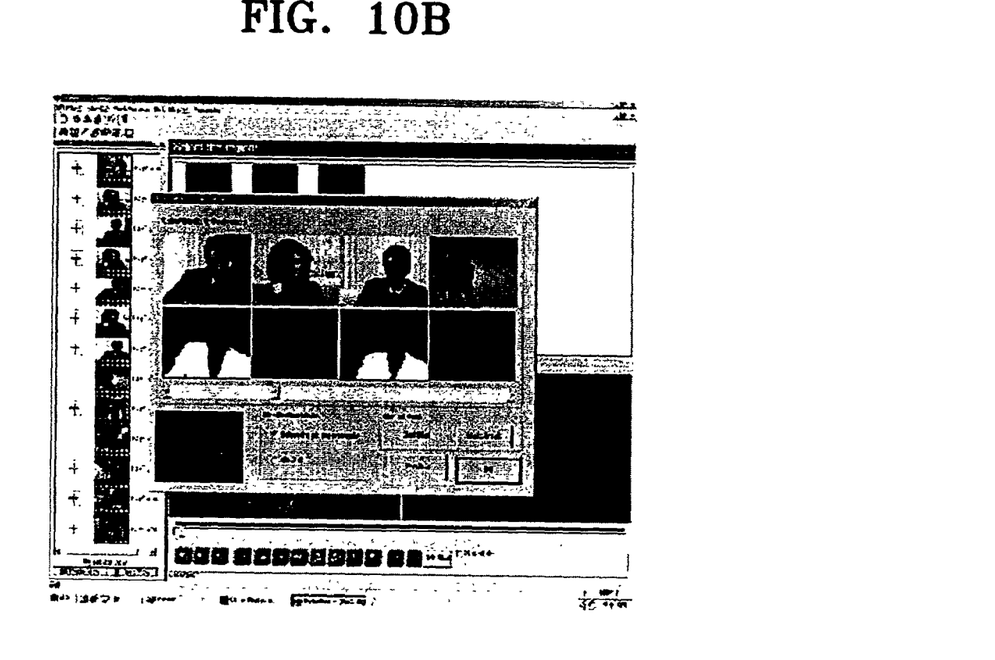

FIGS. 10A and 10B show the results of extracting two different objects from object extraction target images. FIG. 10A shows the results of extracting the clothes (an object to be extracted) of a woman from four object extraction target images according to the present invention. FIG. 10B shows the results of extracting the clothes (an object to be extracted) of a man from four object extraction target images according to the present invention.

The present invention can be realized as a program which can be executed in a computer. The program can be implemented in a universal digital computer using a medium which can be applied to the computer. The medium may be a magnetic storage medium (for example, a ROM, a hard disc, or a floppy disc), an optical readable medium (for example, a CD-ROM or DVD), or a carrier wave (for example, transmitted through Internet).

As described above, unlike conventional object extraction based on motion, the present invention allows an object in an object extraction target image to be extracted regardless of whether the object has a motion or not. In addition, it is not required that the object extraction target image should be a sequence of moving image frames. In comparison with a method of extracting an object using only a single kind of information such as a color feature or a texture feature, the present invention realizes more accurate object extraction. Since automatic object extraction is performed in response to the input of a query image including an object to be extracted and an object extraction target image, the present invention saves time taken to manually extract the object. The present invention can be usefully applied to video editors, video authoring tool, object based video encoder, interactive video authoring tool, and the like in which automatic extraction of an image region of a particular object is required.

While this invention has been particularly shown and described with reference to preferred embodiments thereof, it will be understood by those skilled in the art that various changes in form and details may be made therein. Accordingly, the above preferred embodiments are considered as used in descriptive sense only and not for purpose of limitation. Therefore, the true scope of the invention will be defined by the appended claims.

What is claimed is:

1. An apparatus for extracting an object from an image, comprising:
   an image input unit for receiving a query image including an object and an object extraction target image from which the object included in the query image is to be extracted;
   an object position determination unit for determining a position of the object in the object extraction target image using pixel based color feature matching;
   an image segmentation unit for segmenting each of the query image and the object extraction target image into a plurality of regions using image features including color or texture; and
   an object region determination unit for performing matching between the segmented regions in the query image and the segmented regions in the determined position of the object in the object extraction target image using color or texture features and determining a final object region using similarity in spatial adjacency between matching regions obtained as a result of the matching.

2. An apparatus for extracting an object from an image, comprising:
   an image input unit for receiving a guery image including an object and an object extraction target image from which the object included in the guery image is to be extracted;
   an object position determination unit for determining a position of the object in the object extraction target image using pixel based color feature matching;
   an image segmentation unit for segmenting each of the guery image and the object extraction target image into a plurality of regions using image features including color or texture; and
   an object region determination unit for performing matching between the segmented regions in the guery image and the segmented regions in the determined position of the object in the object extraction target image using color or texture features and determining a final object region using similarity in spatial adjacency between matching regions obtained as a result of the matching, wherein the object position determination unit comprises:
   a color histogram calculator for calculating color histograms with respect to the query image and the object extraction target image;
   an image projector for replacing the pixel values with respect to the query image and the object extraction target image with ratio histograms; and
   a candidate object position determiner for determining candidate object positions in the object extraction target image having the ratio histogram.

3. The apparatus of claim 2, wherein the color histogram calculator calculates the number of pixels in a quantized color space with respect to each of the query image and the object extraction target image.

4. The apparatus of claim 2, wherein the candidate object position determiner performs convolution on the value of a mask determined based on a minimum bounding box surrounding the object included in the query image and the object extraction target image having the ratio histogram, calculates color distance differences between pixels with respect to which the resulting values of the convolution is no less than a predetermined threshold in the object extraction target image, and determines pixels as candidate object positions according to the average of color distance differences obtained with respect to each of the pixels in increasing order of the average.

5. The apparatus of claim 2, wherein the image segmentation unit segments the query image and the object extraction target image into regions using the image features including color or texture.

6. The apparatus of claim 2, wherein the object region determination unit comprises:
   a region matching unit for performing region matching with respect to the segmented regions of the query image and segmented regions corresponding to the object position in the object extraction target image using image features including at least color and texture and determining whether the object extraction target image includes an object according to the result of region matching;
   an adjacency matrix calculator for calculating a spatial adjacency matrix with respect to the segmented query image and calculating a spatial adjacency matrix with respect to an image resulting from the region matching on the segmented object extraction target image which is determined as having the object;
   a correspondence region detector for detecting correspondence regions between the query image and the object extraction target image using the adjacency matrixes calculated by the adjacency matrix calculator; and
   a similarity calculator for calculating the similarity between the query image and the object extraction target image based on the correspondence regions and determining a final object region.

7. The apparatus of claim 6, wherein the region matching unit detects a segmented region, which includes a pixel at the determined position of the object and meets a mask determined based on a region surrounding the object in the query image, in the segmented object extraction target image, calculates a similarity distance between each detected region and each of the segmented regions of the query image, and determined whether the object extraction target image includes the object.

8. The apparatus of claim 6, wherein the adjacency matrix calculator assigns label numbers to the segmented regions of the query image and to segmented regions including the object of the query image in the object extraction target image and forms adjacency matrixes in which each element has a first value when corresponding regions are adjacent and has a second value when they are not adjacent, the adjacency matrixes showing information about how adjacent the segmented regions assigned the label numbers are in the query image and the object extraction target image, respectively.

9. The apparatus of claim 6, wherein the correspondence region detector forms a comparison matrix using the adjacency matrixes in different manners according to whether the number of the segmented regions in the query image is greater or less than the number of segmented region in the object extraction target image to show the correspondence regions between the query image and the object extraction target image.

10. The apparatus of claim 6, wherein the correspondence region detector forms a comparison matrix using the adjacency matrixes and using only segmented regions, which have most similar image features to the segmented regions having label numbers in the query image, in the object extraction target image to show the correspondence regions between the query image and the object extraction target image.

11. The apparatus of claim 10, wherein the correspondence region detector determines the segmented regions having the most similar image features to the segmented regions of the query image in the object extraction target image using a distance matrix and reconstructs the comparison matrix according to the correspondence regions between the query image and the object extraction target image.

12. The apparatus of claim 11, wherein the distance matrix has the label numbers of the query image as row values and has the label numbers of the object extraction target image as column values, and each element in the distance matrix is a distance between a region assigned one of the label numbers in the query image and a region assigned one of the label numbers in the object extraction target image.

13. The apparatus of claim 8, wherein the similarity calculator calculates the similarity by dividing the number of elements having the first value in an upper triangular matrix by the number of all elements in the upper triangular matrix in the comparison matrix.

14. A method of extracting an object from an image, comprising the steps of:
(a) receiving a query image including an object and an object extraction target image from which the object included in the query image is to be extracted;
(b) determining a position of the object in the object extraction target image using pixel based color feature matching;
(c) segmenting the query image and the object extraction target image into a plurality of regions using image features including color or texture; and
(d) performing matching between the segmented regions in the query image and the segmented regions in the determined position of the object in the object extraction target image using color or texture features and determining a final object region using similarity in spatial adjacency between matching regions obtained as a result of the matching.

15. A method of extracting an object from an image, comprising the steps of:
(a) receiving a query image including an object and an object extraction target image from which the object included in the query image is to be extracted;
(b) determining a position of the object in the object extraction target image using pixel based color feature matching;
(c) calculating color histograms with respect to the query image and the object extraction target image;
(d) replacing the color histograms with respect to the query image and the object extraction target image with ratio histograms;
(e) determining candidate object positions in the object extraction target image having the ratio histogram;
(f) segmenting the query image and the object extraction target image into a plurality of regions using image features including color or texture; and
(g) performing matching between the segmented regions in the guery image and the segmented regions in the determined position of the object in the object extraction target image using color or texture features and determining a final object region using similarity in spatial adjacency between matching regions obtained as a result of the matching.

16. The method of claim 15, wherein the step (c) comprises calculating the number of pixels at each bin in a quantized color space with respect to each of the query image and the object extraction target image.

17. The method of claim 16, wherein the step (d) comprises calculating the ratio histogram by dividing the number of pixels in each bin with respect to the query image by the number of pixels in all bins with respect to the query image.

18. The method of claim 16, wherein the step (d) comprises defining the ratio histogram as a ratio of the number of pixels in each bin with respect to the query image to the number of pixels in each bin with respect to the object extraction target image.

19. The method of claim 15, wherein the step (e) comprises the steps of:
(e1) performing convolution on the value of a mask determined based on a minimum bounding box surrounding the object included in the query image and the object extraction target image having the ratio histogram,
(e2) calculating color distance differences between pixels with respect to which the resulting values of the convolution is no less than a predetermined threshold in the object extraction target image; and
(e3) determining pixels as candidate object positions according to the average of color distance differences obtained with respect to each of the pixels in increasing order of the average.

20. The method of claim 19, wherein the mask at a pixel $(x_p, y_p)$ is a circle defined by $$W = \begin{cases} 255, & \sqrt{(x-x_p)^2 + (y-y_p)^2} \le WR \\ 0, & \text{otherwise} \end{cases}$$

$$WR = a\left(bs + (bl - bs)b\frac{s}{bl}\right)$$

b1 indicates the length of the longer side of the bounding box, bs indicates the length of the shorter side of the bounding box, and α indicates a variable for adjusting the size of the mask.

21. The method of claim 19, wherein the average color distance difference is defined by $$AD_{pixelcolor} = \frac{1}{N}\sum_{i=1}^{N}\sqrt{(R_q - R_d)^2 + (G_q - G_d)^2 + (B_q - B_d)^2},$$

N indicates the number of valid pixels within the bounding box, q indicates the query image, and d indicates the object extraction target image.

22. The method of claim 15, wherein the step (g) comprises the steps of:
 (g1) performing region matching with respect to the segmented regions of the query image and segmented regions corresponding to the object position in the object extraction target image using image features including color or texture and determining whether the object extraction target image includes an object according to the result of region matching;
 (g2) calculating a spatial adjacency matrix with respect to the segmented query image and calculating a spatial adjacency matrix with respect to an image resulting from the region matching on the segmented object extraction target image which is determined as having the object;
 (g3) detecting correspondence regions between the query image and the object extraction target image using the adjacency matrixes calculated in step (g2); and
 (g4) calculating the similarity between the query image and the object extraction target image based on the correspondence regions and determining a final object region.

23. The method of claim 22, wherein the step (g1) comprises the steps of: (g1-1) detecting a segmented region, which includes a pixel at the determined position of the object and meets a mask determined based on a region surrounding the object in the query image, in the segmented object extraction target image; and (g1-2) calculating a distance difference in color or texture between each detected region and each of the segmented regions of the query image to determine whether the object extraction target image includes the object.

24. The method of claim 23, wherein the distance difference in color or texture is defined as a distance between two regions in a space of an image feature including color or texture, the distance between two regions is calculated from $$D_{CT}(x, y) = \frac{w_c D_c(x, y) + w_t D_t(x, y)}{w_c + w_t},$$

$D_c(x,y)$ and $D_t(x,y)$ indicate a distance between two regions x and y in a color space and a distance between the two regions x and y in a texture space, respectively, and $w_c$ and $w_t$ indicate weight coefficients, respectively, applied to the respective distances.

25. The method of claim 22, wherein the step (g2) comprises assigning label numbers to the segmented regions of the query image and to segmented regions including the object of the query image in the object extraction target image and forming adjacency matrixes in which each element has a first value when corresponding regions are adjacent and has a second value when they are not adjacent, the adjacency matrixes showing information about how adjacent the segmented regions assigned the label numbers are in the query image and the object extraction target image, respectively.

26. The method of claim 22, wherein the step (g3) comprises forming a comparison matrix using the adjacency matrixes in different manners according to whether the number of the segmented regions in the query image is greater or less than the number of segmented region in the object extraction target image to show the correspondence regions between the query image and the object extraction target image.

27. The method of claim 22, wherein the step (g3) comprises forming a comparison matrix using the adjacency matrixes and using only segmented regions, which have most similar image features to the segmented regions having label numbers in the query image, in the object extraction target image to show the correspondence regions between the query image and the object extraction target image.

28. The method of claim 22, wherein the step (g3) comprises determining the segmented regions having the most similar image features to the segmented regions of the query image in the object extraction target image using a distance matrix and reconstructing the comparison matrix according to the correspondence regions between the query image and the object extraction target image.

29. The method of claim 28, wherein the distance matrix has the label numbers of the query image as row values and has the label numbers of the object extraction target image as column values, and each element in the distance matrix is a distance between a region assigned one of the label numbers in the query image and a region assigned one of the label numbers in the object extraction target image.

30. The method of claim 22, wherein when each element in the adjacency matrixes has a first value when corresponding regions are adjacent and has a second value when they are not adjacent, the step (g4) comprises calculating the similarity by dividing the number of elements having the first value in an upper triangular matrix by the number of all elements in the upper triangular matrix in the comparison matrix.

31. The method of claim 27, wherein the step (d4), the similarity is calculated from $$S = \frac{E_u}{M_u},$$

and when each element in the adjacency matrixes has a first value when corresponding regions are adjacent and has a second value when they are not adjacent, $E_u$ indicates the number of elements having the first value in an upper triangular matrix of the comparison matrix, and $M_u$ indicates the number of all elements in the upper triangular matrix.

32. A computer readable recording medium on which a program for executing the method of claim 14 in a computer is recorded.

* * * * *